US010844836B2

(12) United States Patent
Nielbock

(10) Patent No.: US 10,844,836 B2
(45) Date of Patent: Nov. 24, 2020

(54) WIND TURBINE GENERATOR

(71) Applicant: Carlos Nielbock, Detroit, MI (US)

(72) Inventor: Carlos Nielbock, Detroit, MI (US)

(*) Notice: Subject to any disclaimer, the term of this patent is extended or adjusted under 35 U.S.C. 154(b) by 0 days.

(21) Appl. No.: 16/542,767

(22) Filed: Aug. 16, 2019

(65) Prior Publication Data

US 2020/0056587 A1 Feb. 20, 2020

Related U.S. Application Data

(60) Provisional application No. 62/719,149, filed on Aug. 17, 2018.

(51) Int. Cl.
| | | |
|---|---|---|
| *F03D 7/02* | (2006.01) | |
| *F03D 1/06* | (2006.01) | |
| *F03D 9/00* | (2016.01) | |
| *F03D 9/25* | (2016.01) | |

(52) U.S. Cl.
CPC ......... *F03D 7/0224* (2013.01); *F03D 1/0633* (2013.01); *F03D 1/0658* (2013.01); *F03D 9/007* (2013.01); *F03D 9/25* (2016.05); *F05B 2220/706* (2013.01); *F05B 2220/708* (2013.01); *F05B 2240/221* (2013.01); *F05B 2260/70* (2013.01)

(58) Field of Classification Search
CPC ........ F03D 7/0224; F03D 9/25; F03D 1/0633; F03D 1/0658; F03D 9/007; F05B 2220/706; F05B 2220/708; F05B 2240/221; F05B 2260/70
See application file for complete search history.

(56) References Cited

U.S. PATENT DOCUMENTS

| | | | | |
|---|---|---|---|---|
| 2,159,653 A | * | 5/1939 | Carlin ..................... | F03D 3/065 416/123 |
| 4,025,233 A | * | 5/1977 | Moran ................... | F03D 1/0658 416/207 |
| 4,321,005 A | * | 3/1982 | Black ....................... | F03D 3/02 415/4.2 |
| 4,509,899 A | * | 4/1985 | Frederick ................ | B63H 1/14 416/99 |
| 4,678,923 A | * | 7/1987 | Trepanier .............. | F03D 7/0224 290/55 |

(Continued)

FOREIGN PATENT DOCUMENTS

| | | |
|---|---|---|
| CN | 106499576 A | 3/2017 |
| DE | 3130257 A1 | 2/1983 |
| KR | 20040062468 A | 7/2004 |

*Primary Examiner* — Tulsidas C Patel
*Assistant Examiner* — Joseph Ortega
(74) *Attorney, Agent, or Firm* — Wayne State University Patent Clinic

(57) ABSTRACT

A wind turbine assembly comprising a cantilever support, a rotor assembly having a rotor hub rotatably coupled to the cantilever support, and a plurality of rotors radially arranged about and coupled to the rotor hub is provided. Each rotor includes a rotor arm defining an arm axis, a blade element, and an adjustment mechanism coupled between the rotor arm and the blade element. The blade element has a concave face portion and defines a target axis. The adjustment mechanism is movable between a first rake angle defined between the first arm axis and the target axis, and a second rake angle to position each of the blade elements relative to each other.

20 Claims, 5 Drawing Sheets

(56) References Cited

U.S. PATENT DOCUMENTS

| | | | | |
|---|---|---|---|---|
| 5,656,865 A * | 8/1997 | Evans | | F03D 3/00 290/55 |
| 6,247,897 B1 * | 6/2001 | Patel | | B63H 1/26 416/197 R |
| 6,641,367 B1 * | 11/2003 | Van der Klippe | | F03D 1/02 416/99 |
| 6,945,747 B1 * | 9/2005 | Miller | | F03D 15/00 415/4.3 |
| 6,948,905 B2 * | 9/2005 | Horjus | | F03D 3/02 415/4.2 |
| 8,167,571 B2 * | 5/2012 | Bernatz | | F03D 1/0608 416/227 R |
| 9,441,712 B1 * | 9/2016 | Tjensvoll | | F03D 15/00 |
| 2003/0071468 A1 * | 4/2003 | Platt | | F03D 9/25 290/55 |
| 2006/0251516 A1 * | 11/2006 | Sohn | | F03D 1/04 416/132 B |
| 2008/0075594 A1 * | 3/2008 | Bailey | | F03D 3/068 416/104 |
| 2009/0016887 A1 * | 1/2009 | Vettese | | F03D 1/0691 416/198 R |
| 2009/0104039 A1 * | 4/2009 | Vettese | | F03D 1/0633 416/223 R |
| 2010/0270808 A1 * | 10/2010 | Bates | | F03D 9/25 290/55 |
| 2011/0020123 A1 * | 1/2011 | Anderson | | F03D 3/068 416/98 |
| 2011/0030361 A1 * | 2/2011 | Gopalswamy | | F03D 9/17 60/398 |
| 2011/0057453 A1 * | 3/2011 | Roberts | | F03D 9/32 290/55 |
| 2011/0211957 A1 * | 9/2011 | Folsom | | F03D 1/0658 416/41 |
| 2012/0068466 A1 * | 3/2012 | Gilbert | | F03D 15/00 290/55 |
| 2012/0134823 A1 * | 5/2012 | Tully | | F03D 1/0633 416/131 |
| 2013/0216381 A1 * | 8/2013 | Liu | | F01D 5/00 416/79 |
| 2013/0315732 A1 * | 11/2013 | Sutz | | F03D 1/0625 416/9 |
| 2014/0341709 A1 * | 11/2014 | Yamodo | | F03B 11/02 415/60 |
| 2015/0152844 A1 * | 6/2015 | Pitre | | F03D 7/0268 416/1 |
| 2015/0233353 A1 * | 8/2015 | Bertony | | F03D 7/06 416/146 R |
| 2015/0337809 A1 * | 11/2015 | Jordan, Sr. | | H02N 2/18 290/50 |
| 2015/0345473 A1 * | 12/2015 | Bardia | | H02K 7/114 290/44 |
| 2016/0010627 A1 * | 1/2016 | Austin | | F03D 1/02 290/55 |
| 2016/0237987 A1 * | 8/2016 | Manceau | | F03D 7/0236 |
| 2017/0114778 A1 * | 4/2017 | Madson | | H02K 7/1823 |
| 2017/0306921 A1 * | 10/2017 | Young | | F03D 1/0675 |
| 2018/0002012 A1 * | 1/2018 | McCullough | | B64D 25/12 |
| 2018/0128244 A1 * | 5/2018 | Lu | | F03D 1/02 |
| 2018/0163695 A1 * | 6/2018 | Sutz | | F03D 1/04 |
| 2018/0202412 A1 * | 7/2018 | Yang | | F03B 13/183 |
| 2018/0342940 A1 * | 11/2018 | Cheng | | F04D 25/166 |
| 2019/0093630 A1 * | 3/2019 | Grunnet | | F03D 1/02 |
| 2019/0153998 A1 * | 5/2019 | Fracaroli | | F03D 3/005 |
| 2020/0132043 A1 * | 4/2020 | Brewer | | F03D 3/02 |

* cited by examiner

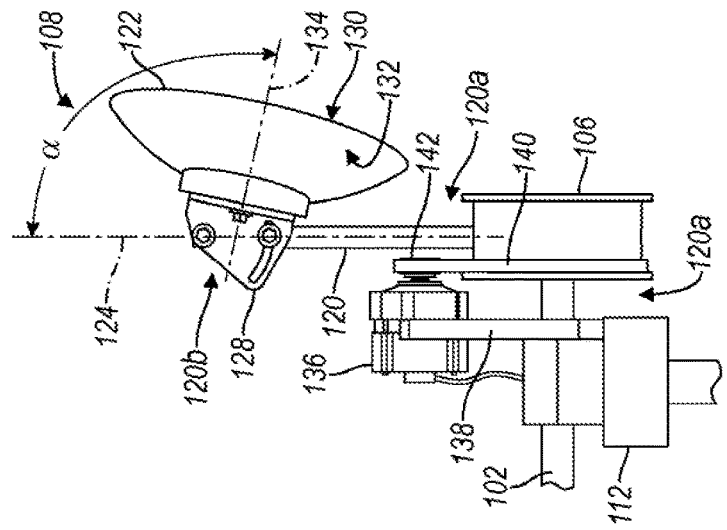

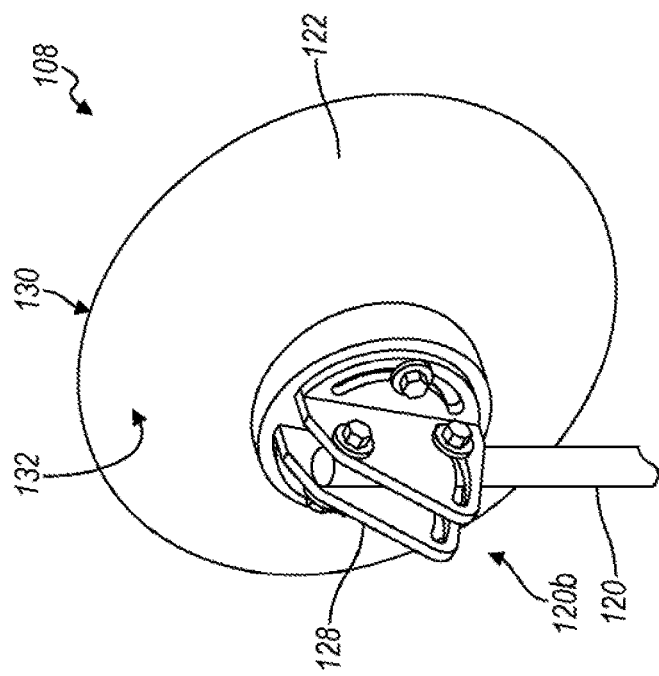
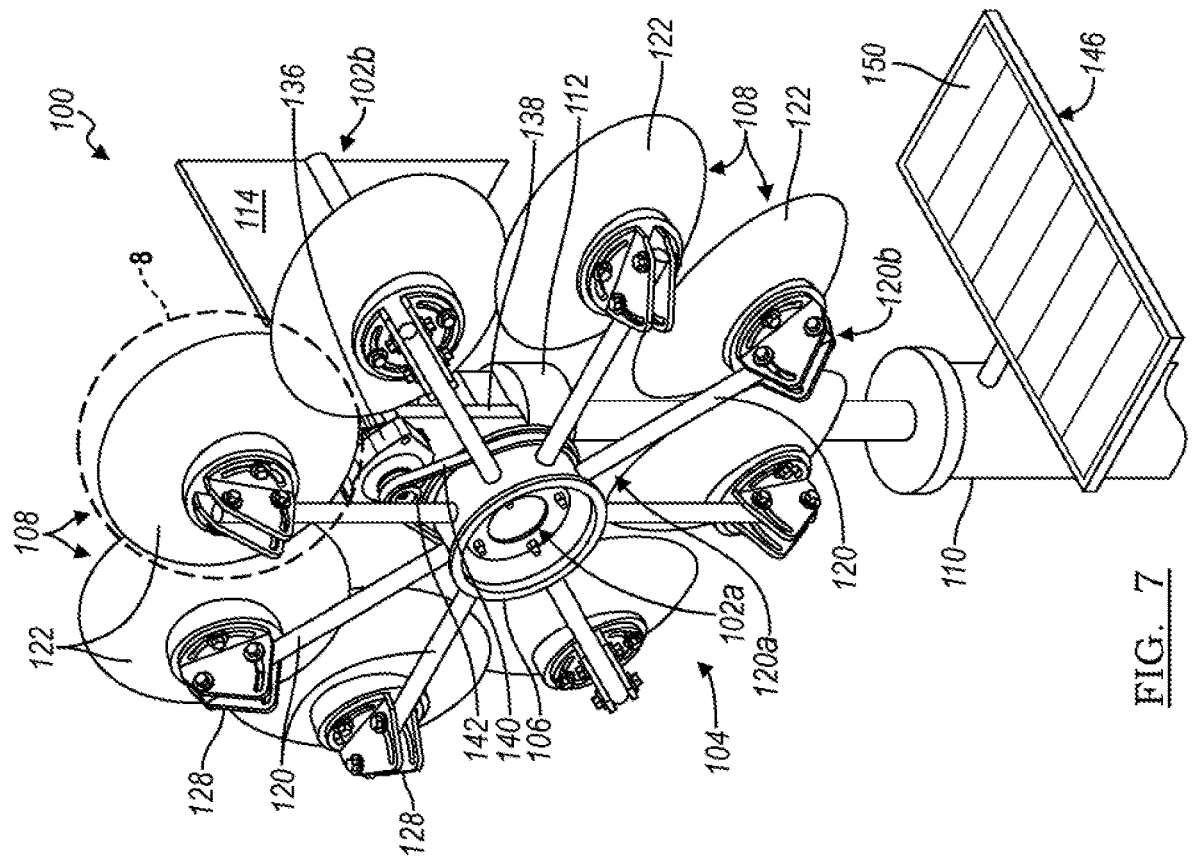

__US 10,844,836 B2__

WIND TURBINE GENERATOR

CROSS-REFERENCE TO RELATED APPLICATIONS

This patent application claims priority to U.S. Provisional Patent Application No. 62/719,149, filed Aug. 17, 2018, which is incorporated herein by reference in its entirety.

BACKGROUND

Global energy use is ever increasing and demand for renewable sources of energy is increasing. Likewise, clean energy sources are desired to lessen the effects of climate change. One source of renewable clean energy is blowing wind, which can be harnessed and used to generate electricity. A wind turbine is turned by the flow of air and converted to shaft energy which is used to power generators. Many wind turbines are located in undeveloped areas where large numbers of wind turbines can be installed in farms. These wind turbines frequently reach heights of 100 m or more and require expensive foundations to support their weight. Due to their size these wind turbines are unsuitable for use at low altitudes and in developed areas where wind direction and speed are unpredictable. There is a need for a wind turbine that overcomes one or more of these disadvantages.

SUMMARY

A wind turbine assembly for generating electrical energy and optimized for use in developed areas with low wind speeds and changing directions. The wind turbine assembly comprises a cantilever support, a rotor assembly having a rotor hub rotatably coupled to the cantilever support, and a plurality of rotors radially arranged about and coupled to the rotor hub. Each rotor includes a rotor arm and each rotor arm defines a first arm axis and a second arm axis perpendicular to the first arm axis. A blade element is coupled to each of the rotor arms opposite to the rotor hub. Each blade element has a concave face portion and defines a target axis. Each rotor assembly further includes an adjustment mechanism arranged between the rotor arm and the respective blade element, the adjustment mechanism movable between a first rake angle and a second rake angle to position each of said blade elements relative to each other.

BRIEF DESCRIPTION OF THE DRAWINGS

Other advantages of the present invention will be readily appreciated as the same becomes better understood by reference to the following detailed description when considered in connection with the accompanying drawings.

FIG. 4 is an enlarged rear perspective view of the wind turbine assembly of FIG. 2.

FIG. 5 is a side plan view of the wind turbine assembly showing a single rotor having a blade element defining a target axis and a rake angle according to one embodiment.

FIG. 6 is a top plan view of the wind turbine assembly showing a blade element defining a target axis and a pitch angle.

FIG. 7 is a front perspective view of a wind turbine assembly and a plurality of rotors according to another embodiment.

FIG. 8 is an enlarged perspective view of an adjustment mechanism for a blade element.

DETAILED DESCRIPTION

Figure 1:
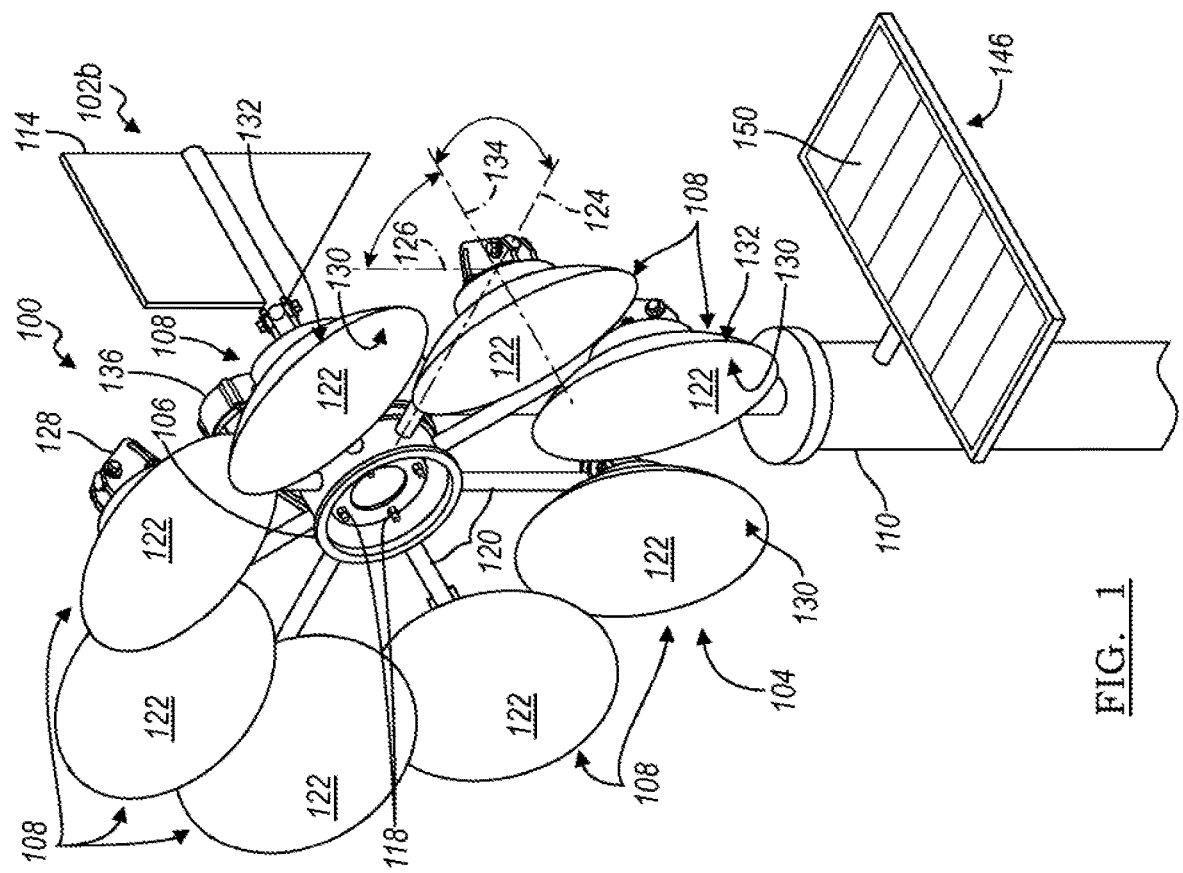
FIG. 1 is a front perspective view of a wind turbine assembly and a plurality of rotors according to one embodiment.

With reference to the Figures, wherein like numerals indicate like parts throughout the several views, this disclosure provides a wind turbine assembly 100 for generating electrical energy and optimized for use in developed areas with low wind speeds and changing directions. As shown in FIG. 1, the wind turbine assembly 100 includes a cantilever support 102, a rotor assembly 104 having a rotor hub 106 rotatably coupled to the cantilever support 102, and a plurality of rotors 108 radially arranged about and coupled to the rotor hub 106. The cantilever support 102 is rotatably coupled to a support stand 110 and spaced from a ground surface thereby allowing the rotor assembly 104 to rotate. Here, the support stand 110 is shown as a column, which is anchored to the ground at a first end and extends upwards from the ground toward a second end. A support bearing assembly 112 is coupled between the second end of the support stand 110 and the cantilever support 102 to facilitate rotation of the cantilever support 102 relative to the support stand 110. The support bearing assembly 112 supports both the axial load from the weight of the cantilever arm 102 and the rotor assembly 104 as well as radial loads from operation of the rotor assembly 104. More specifically, the support bearing assembly 112 is a taper roller bearing, such as the type commonly found in an automotive axle, however it should be appreciate that the support bearing assembly 112 may be a ball bearing, a journal bearing, and other types known in the art.

Figure 2:
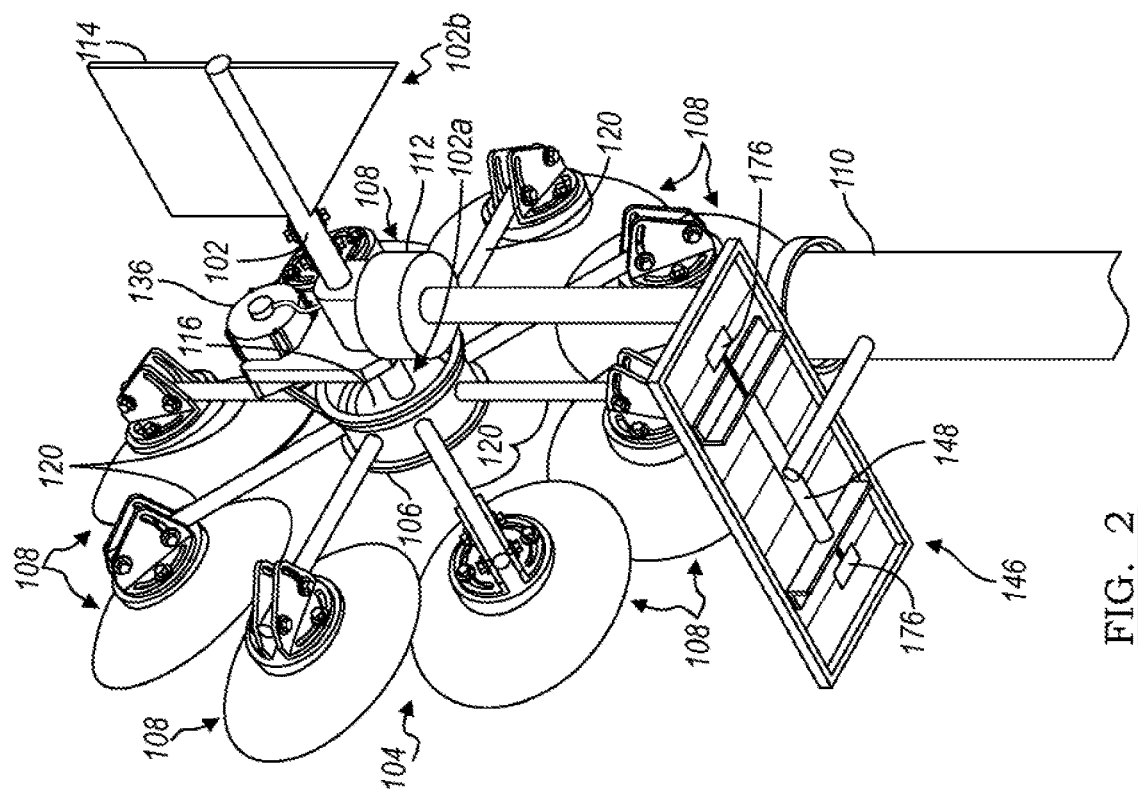
FIG. 2 is a rear perspective view of the wind turbine assembly of FIG. 1.

With reference to FIGS. 1 and 2, the cantilever support 102 is shown extending in a direction generally perpendicular to the support stand 110 between a head end 102a and a tail end 102b. The cantilever support 102 is arranged with the support stand 110 between the head end 102a and the tail end 102b. A vane 114 is coupled to the tail end 102b of the cantilever support 102 and reacts to the direction of wind flow to rotate the cantilever support 102 such that the head end 102a is facing into the direction of wind flow. The vane 114 may have different profiles and sizes as necessary to exert an amount of force necessary to rotate the cantilever support 102. Similarly, the vane 114 may be spaced further from or closer to the support stand 110 to increase the force available to rotate the cantilever support 102. In addition to the vane 114, a rotor bearing 116 is coupled to the head end 102a of the cantilever support 102.

As described above the wind turbine assembly 100 includes the rotor assembly 104 and the rotor hub 106. The rotor assembly 104 is arranged at the head end 102a of the cantilever support 102 and configured to rotate about an axis generally parallel of the direction of wind flow. The rotor assembly 104 is supported for rotation by the rotor bearing 116, which is coupled to the rotor hub 104. In the embodiment shown throughout the figures, the rotor hub 106 is a wheel, generally circular in shape, which is configured to be coupled to the rotor bearing 116 with threaded fasteners 118. More specifically, the rotor bearing 116 is couple between the cantilever support 102 and the rotor hub 104 to rotatably support the rotor assembly 102. The rotor bearing 116 supports axial forces imparted by wind flow against the rotor assembly 102 in addition to radial forces associated with the weight of the rotor assembly 102. Similar to the support bearing assembly 112 referred to above, the rotor bearing 116 is a taper roller bearing, such as the type commonly found in an automotive axle. Those having ordinary skill in the art will recognize that alternative bearing types may be substituted, such as ball bearings and journal bearings.

Referring to FIGS. 1-3B, the rotor assembly 104 includes the plurality of rotors 108 radially arranged about and coupled to the rotor hub 106. Here, the plurality of rotors 108 is shown as eight rotors, each arranged at approximately 45 intervals. Each rotor 108 includes a rotor arm 120 and a blade element 122. The rotor arms 120 are coupled to the rotor hub 106 at a first end 120a and extend radially outward along toward a second end 120b. The rotor arm 120 defines a first arm axis 124 along which the rotor arm 120 extends. The rotor arms 120 may be coupled to the rotor hub 106 using fabrication methods known in the art, for example, welding as is used here. Alternative fabrication methods include fasteners such as bolts or brackets. It is further contemplated that the rotor arms 120 may be integrally formed with the rotor hub 106. Furthermore, while the rotor arms 120, and respective first arm axes 124 are generally oriented perpendicular to the rotation axis of the rotor hub, the rotor arms 120 may be angled toward the head end 102a or tail end 102b of the cantilever support 102.

In addition to the first arm axis 124, each rotor arm 120 further defines a second arm axis 126 perpendicular to the first arm axis 124, best shown in FIGS. 4 and 6. The second arm axis 126 is defined through the second arm end 120b of the rotor arm 120 and is generally parallel to the direction of rotation of the rotor hub 106. Said differently, for a rotor 108 that is rotating in a clockwise direction when view from the font (FIG. 3A) and in a vertical "12 o'clock" position, the first arm axis 124 would be vertical and the second arm axis 126 would be horizontal. It will be appreciate that "horizontal" and "vertical" are merely words of description and are relative to the angle of each rotor 108 as it rotates during operation.

As described above, each rotor 108 includes a blade element 122 coupled to each rotor arm 120 and arranged opposite the rotor hub 106. Each rotor 108 further includes an adjustment mechanism 128 coupled between the blade element 122 and the rotor arm 102, which will be described in further detail below. As shown throughout the figures, each of the blade elements 122 has a generally circular profile when viewed from the front, however varying degrees of circularity are contemplated. For example the profile may be oval shaped with elongated portions. Each blade element 122 has two profile faces, a concave face 130 and a mounting face 132. The mounting face 132 is oriented opposite the concave face 130 and is configured to be coupled to the adjustment mechanism 128. Here, the mounting face 132 and the adjustment mechanism 128 are coupled using threaded fasteners however, similar to above, fabrication methods such as welding, brazing, and the like may be used interchangeably.

In order to realize advantages from upcycling components of the wind turbine assembly 100, the blade element 122 may be a satellite dish reflector, with the concave face 130 of the blade element 122 being a parabolic face of the satellite dish, thus the concave face 130 defines a parabolic surface. The concave face 130 of the blade element 122 further defines a target axis 134 that extends outwardly from the concave face and through a focal point defined by the parabolic surface. In this way the target axis 134 may be further defined as a focal axis of the parabolic surface. The target axis 134 characterizes the position of the blade element 122 relative to the rotor arm 120 as the blade elements 122 are oriented using the adjustment mechanism 128. Specifically, the target axis 134 can be aimed in a direction defined by a rake angle α and a pitch angle β, discussed in further detail below.

In order to support aiming of the target axis 134 the adjustment mechanism 128 is movable between a first rake angle α defined between the first arm axis 124 and the target axis 134, and a second rake angle α to position each of the blade elements 122 relative to the other. FIG. 5 shows a side view of the wind turbine assembly 100 with only a single rotor 108 in a vertical position. Here, the target axis 134 is shown aimed away from the vane 114 (FIG. 4) with the rake angle α being measured between the first arm axis 124 and the target axis 134.

Referring to FIG. 6, which is a top view of the wind turbine assembly 100 of FIG. 5 showing only a single rotor 108 in a vertical position. Here, the target axis 134 is shown skew to the axis about which the rotor hub 106 rotates. The adjustment mechanism 128 is movable between a first pitch angle β defined between the second arm axis 126 and the target axis 134, and a second pitch angle β to position each of the blade elements 122 relative to each other. The adjustment mechanism 128 moves the blade element 122 to rotate about the first arm axis 124 to angle the target axis 134 at the pitch angle β measured between the second arm axis 126 and the target axis 134.

Figure 3B:
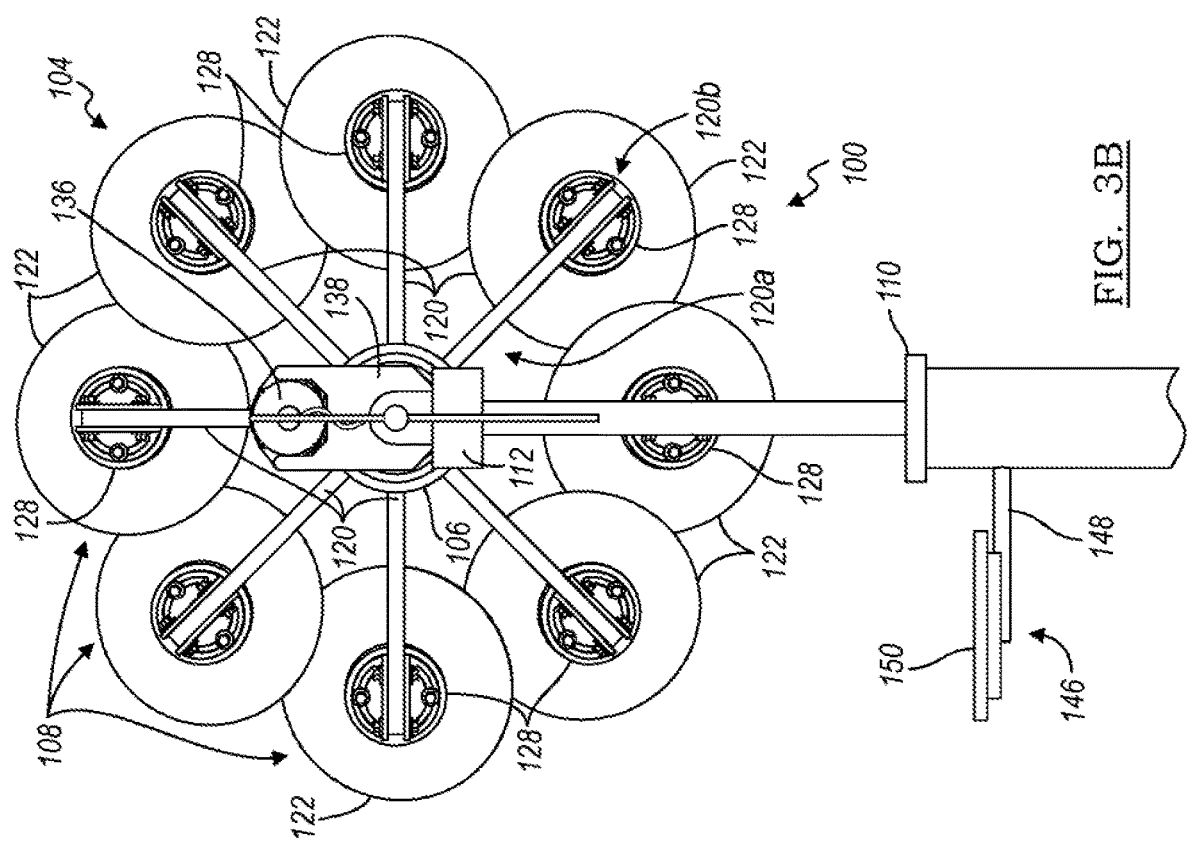
FIG. 3B is a rear plan view of the wind turbine assembly of FIG. 1.
Figure 3A:
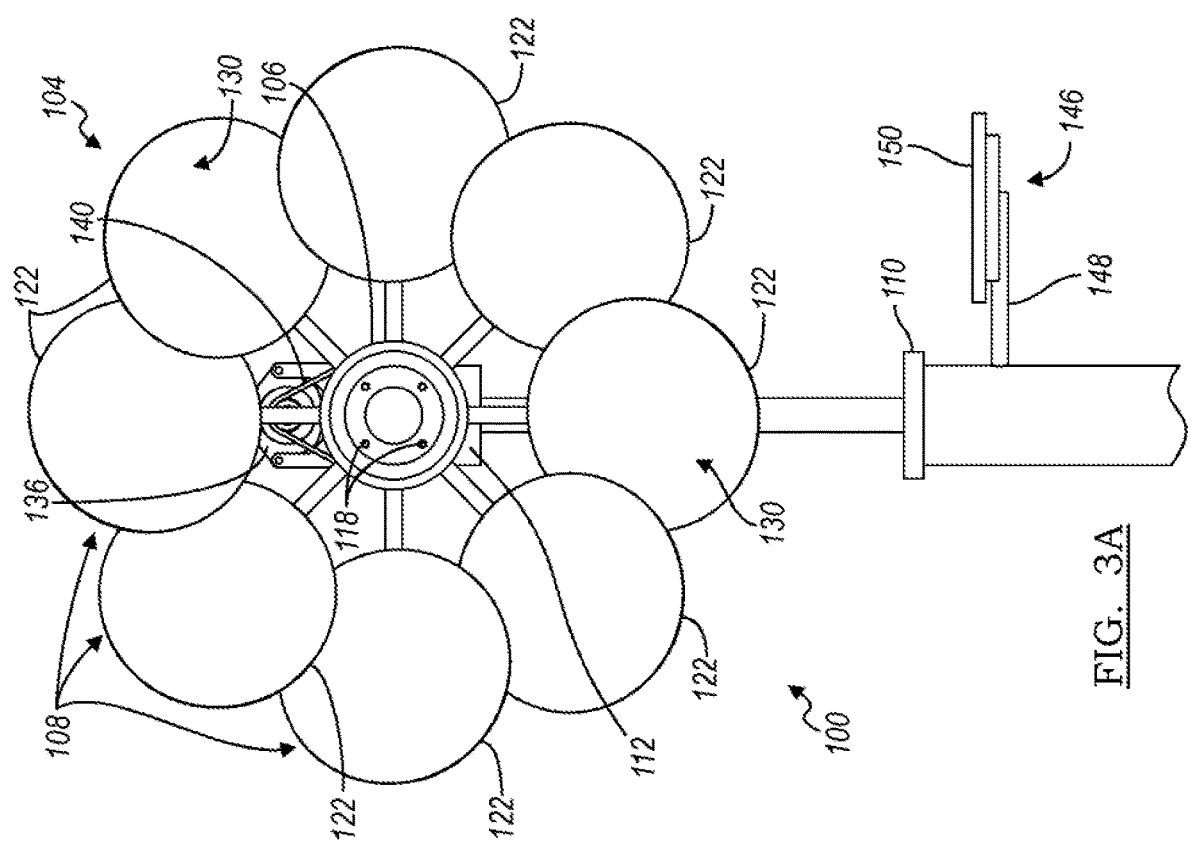
FIG. 3A is a front plan view of the wind turbine assembly of FIG. 1.

Best shown in FIGS. 3A and 3B, each of the blade elements 122 are arranged at approximately 45° intervals around the rotor hub 106. Here, the blade elements 122 are overlapping when each other when viewed from a front direction. Said differently, each of the blade elements 122 are radially arranged about the rotor hub 106 each of the blade elements 122 overlapping an adjacent blade element 122. The blade elements 122 are spaced at a distance such that a width of the blade elements 122 defines a circular profile about the axis of rotation of the rotor hub 106. In order to accommodate the width of each blade element 122, each of the blade elements 122 are oriented with respective pitch angles θ in the same direction and at similar angles. The orientation of the blade elements 122 is such that collectively the blade elements 122 resemble helical segments. Each blade element 122 is radially spaced from the rotor hub 106 along the rotor arm 102 to accommodate a height of each blade element 122.

With reference to the embodiment shown in FIGS. 4-6, a single target axis 134 is shown. In this embodiment the blade elements 122 are shown in a first configuration with the target axes 134 aimed away from the vane 114. Here, the blade elements 122 can be said to be forward facing, such that the concave face 130 of each blade element 122 is facing into the direction of wind flow, and the vane 114 extending rearwardly in the direction of the wind flow. When the target axes 134 are aimed away from the vane 114, each target axis extends from the concave face 130 of each blade element 122 towards a point further from the vane 114 than the blade element 122. Said differently, the rake angle α is greater than 90 degrees to the axis about which the rotor hub 106 rotates.

Alternatively, a second embodiment is shown in FIG. 7, in which the blade elements 122 are shown in a second configuration with the target axes 134 aimed toward from the vane 114. Here, the vane 114 can be said to be forward facing, such that the concave face 130 of each blade element 122 is facing into the direction of wind flow, and the vane 114 extends forward in the opposite direction of the wind flow. When the target axes 134 are aimed toward the vane 114, each target axis extends from the concave face 130 of each blade element 122 towards a point nearer to the vane 114 than the blade element 122. Said differently, the rake angle α is less than 90 degrees to the axis about which the rotor hub 106 rotates.

Torque generated by the rotation of the rotor assembly 104 is converted into electricity using a generator 136. The generator 136 is coupled to the cantilever arm 102 and operably coupled to the rotor hub 106. A generator bracket 138 is fixed to the cantilever arm 102 to support the generator 136 and provide a reaction force supporting the generator 136 for operation. A drive element 140 is operably coupled between the generator 136 and the rotor hub 106 and configured to translate torque therebetween. Here, the drive element 140 is illustrated as a v-belt and pulley arrangement. The generator 136 includes a rotor (not shown) supported within the generator 136 and rotatable to generate electricity and a pulley 142 coupled to the rotor and engagable with the drive element 140 to transfer torque between the rotor hub 106 and the generator 136.

As the rotor assembly 104 rotates due to the movement of air over the blade elements 122 of the rotor 108 this rotation is transferred to the drive element 140, here, the v-belt. The drive element 140 causes the pulley 142 coupled to the generator 136 to rotate in a corresponding manner and in turn generate electricity. The electricity that has been generated can be stored or later use or used immediately, as will be discussed in further detail below.

While the drive element 140 shown throughout the figures is a v-belt and pulley arrangement, it will be appreciated that many variations of the drive element 140 are possible without departing from the scope of the present invention. For example, a toothed belt and pulley could be utilized to transfer torque between the generator 136 and the rotor hub 106 in a continuous manner without slipping. This configuration of the drive element 140 may also employ a spring biased tensioner to tension the belt. Similarly, a serpentine belt may also be used. A further exemplary drive element may be realized as a chain and sprocket. Further still, the generator 136 and the rotor hub 106 may be directly coupled using a suitable coupler such that the rotor assembly 104 and the generator 136 rotate together. Other embodiments are contemplated.

As mentioned above the wind turbine assembly 100 includes the generator 136 that generates electricity from mechanical energy. In some embodiments that generator 136 is further defined as a permanent magnet DC generator. The permanent magnet DC generator includes a rotor having permanent magnets and a stator having electrical coils. As the rotor spins the permanent magnets move relative to the stator coils generating electricity. This electricity can be used for various purposes, such as charging energy storage devices 144 or for providing power to an electrical grid. The electricity generated by the generator 136 can also be used to power systems that are part of the wind turbine assembly 100, as will be discussed in further detail below.

In order to produce a greater amount of electricity the wind turbine assembly 100 further includes a solar generator unit 146 coupled to the support stand 110. The solar generator unit 146 comprises an attachment frame 148 and a photovoltaic cell 150 capable of converting light, typically from the sun, into electricity. Similar to the generator 136, the electricity produced by the photovoltaic cell 150 can be used to charge the energy storage devices 144. The wind turbine assembly 100 may comprise more than one solar generator unit 146, and each solar generator unit 146 may comprise more than one photovoltaic cell 150 as necessary, based on expected wind patterns where the wind turbine assembly 100 will be installed, as well as the size and storage capacity of the energy storage devices 144. The solar generator unit 146 may be configured to tilt the photovoltaic cell 150 to face the light source more directly, such as by following the path of the sun throughout a day.

Figure 9:
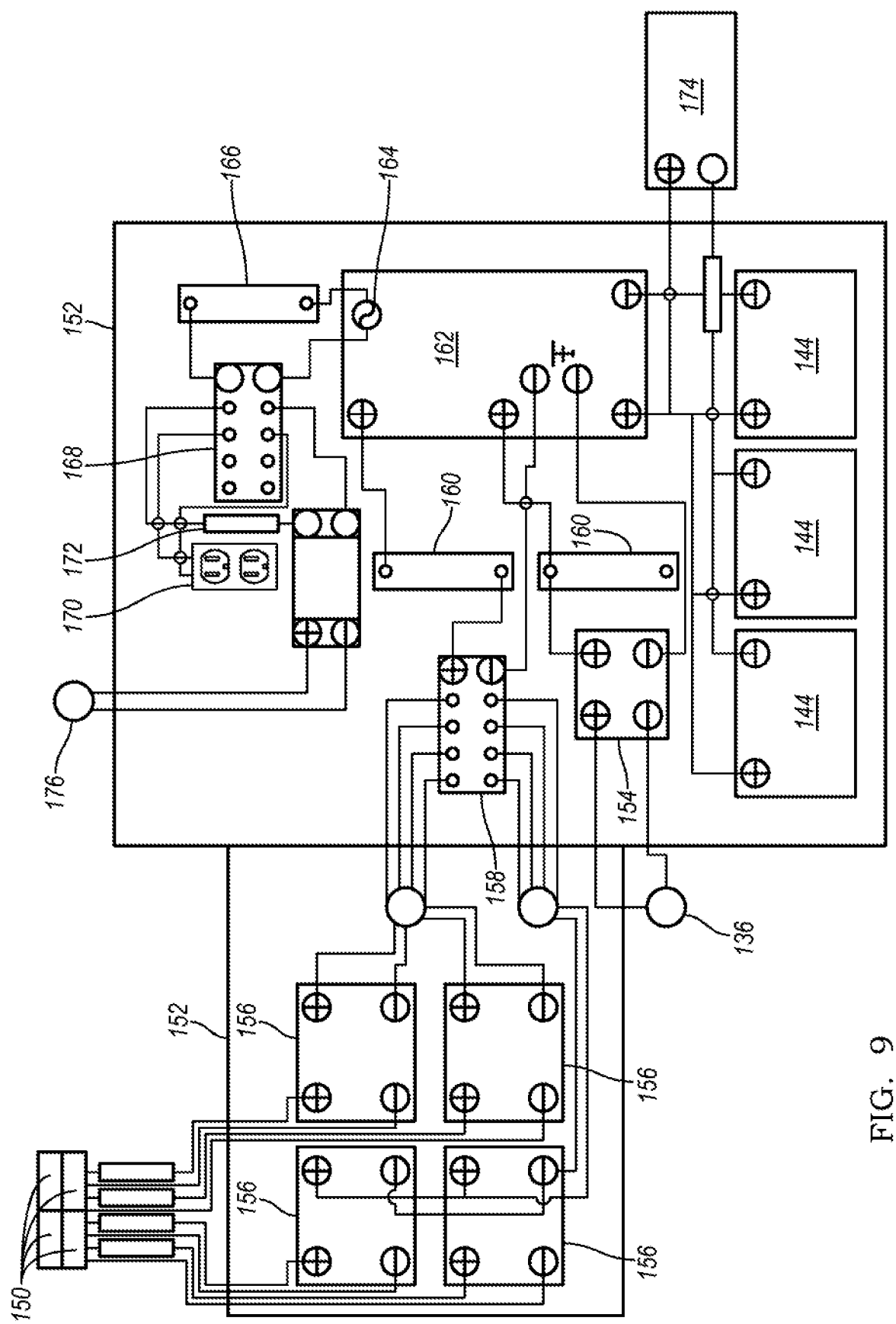
FIG. 9 is an electrical schematic for a wind turbine assembly.

Referring now to FIG. 9, an electrical schematic is shown for the wind turbine assembly 100. Electrical components included in the schematic are configured to control the generation and storage of electricity by the wind turbine assembly 100, as well as protection components that are configured to prevent unintended discharge of electricity in an unsafe manner. The electrical components are enclosed in a cabinet 152 for protection from outdoor elements such as water and dust. The wind turbine assembly 100 comprises a turbine charge controller 154 in electrical communication with the generator 136. The turbine charge controller 154 provides a voltage regulated output from the electricity input by the generator 136.

The wind turbine assembly 100 further comprises a solar charge controller 156 in electrical communication with the solar generator unit 146. Similar to the turbine charge controller 154, the solar charge controller 156 provides a voltage regulated output from the electricity input by the solar generator unit 136. In the embodiment shown, the wind turbine assembly 100 comprises four photovoltaic cells 150, each coupled to a respective solar charge controller 156. Each of the solar charge controllers 156 is electrically connected to a solar combiner 158, which combines the electricity generated by each photovoltaic cell 150 into a single output. In order to prevent excess current from damaging one or more of the electrical components of the wind turbine assembly 100, the outputs of the turbine charge controller 154 and the solar charge controller 156 are each limited by a breaker 160.

The wind turbine assembly 100 further comprises an AC inverter 162 in electrical communication with the generator 136. The AC inverter 162 is coupled to the output of the turbine charge controller 154 and to the output of the solar combiner 158. Using the DC electricity from turbine charge controller 154 and the output of the solar combiner 158, the AC inverter 162 produces an AC electricity output 164 that can be used to power AC electronics, or fed back into the electrical grid. In addition to feeding electricity back into the electrical grid, several wind turbine assemblies 100 can be combined with each other to create a micro-grid. The AC output 164 is protected by a breaker 166 that limits the amount of current that the AC electronics can draw.

In the example illustrated in FIG. 9, a distribution block 168 is connected to the AC output 164 that allows several AC electronics to receive power from the AC output 164. Power is supplied to AC electronics via an electrical socket 170 that is coupled to the distribution block 168 and further protected with a fuse 172. AC electronics that can be powered by the electrical socket 170 may include a cell phone or laptop charger. The AC output 164 also provides power to a lighting element 176, which is used to provide illumination around the wind turbine assembly 100. The lighting element 176 is coupled to the attachment frame 148 and illuminates below the solar generator unit 146. Alternatively, the AC output 164 can provide power to systems, such as storm drainage or crop irrigation, in the event that the electrical grid becomes unavailable.

With continued reference to FIG. 9, the energy storage device 144 is shown coupled to the AC inverter 162. The AC inverter 162 transfers DC energy from the generator 136 and the solar generator unit 146 to the energy storage device 144, which is able to be used when the generator 136 or solar generator unit 146 are not producing any electricity. More than one energy storage device 144 may be connected to the AC inverter 162. As shown here, three energy storage devices 144 are arranged in parallel and connected to the AC inverter 162. These energy storage devices 144 are 12v lead acid batteries, however other types of energy storage device 144 are contemplated. For example, batteries having different chemistries, such as lithium polymer, or different voltages may be used. A power meter 174 is connected in-line with the energy storage device 144 to monitor the amount of electricity that is transferred to and from the energy storage device 144.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A wind turbine assembly comprising:
a cantilever support;
a rotor assembly having a rotor hub rotatably coupled to said cantilever support; and
a plurality of rotors radially arranged about and coupled to said rotor hub, each rotor including
a rotor arm with each rotor arm defining a first arm axis,
a blade element coupled to said rotor arm opposite to said rotor hub, said blade element having a concave face portion and defining a target axis, and
an adjustment mechanism arranged between a respective one of the rotor arms and a respective one of the blade elements, said adjustment mechanism moveable between a first rake angle defined between said first arm axis and said target axis, and a second rake angle to position the blade elements relative to each other.

2. The wind turbine assembly of claim 1, wherein each of said plurality of rotor arms defines a second arm axis perpendicular to said first arm axis with said adjustment mechanism further movable between a first pitch angle defined between said second rotor axis and said target axis, and a second pitch angle to position each of said blade elements relative to each other.

3. The wind turbine assembly of claim 1, further comprising a generator coupled to said cantilever arm and operably coupled to said rotor hub.

4. The wind turbine assembly of claim 3, further comprising a drive element operably coupled between said rotor hub and said generator to translate torque therebetween.

5. The wind turbine assembly of claim 3, further comprising a charge controller in electrical communication with said generator.

6. The wind turbine assembly of claim 3, further comprising an energy storage device in electrical communication with said generator.

7. The wind turbine assembly of claim 3, further comprising an AC inverter in electrical communication with said generator.

8. The wind turbine assembly of claim 3, wherein said generator is further defined as a permanent magnet DC generator.

9. The wind turbine assembly of claim 1, further comprising a vane coupled to said cantilever support opposite said rotor assembly.

10. The wind turbine assembly of claim 9, wherein each of said target axes aims away from said vane.

11. The wind turbine assembly of claim 9, wherein each of said target axes aims toward said vane.

12. The wind turbine assembly of claim 1, wherein said blade element is radially spaced from said rotor hub.

13. The wind turbine assembly of claim 1, further comprising a rotor bearing assembly coupled between said cantilever arm and said rotor hub to rotatably support said rotor assembly.

14. The wind turbine assembly of claim 1, wherein said blade elements are radially arranged about said rotor hub with each of said blade elements overlapping an adjacent blade element.

15. The wind turbine assembly of claim 1, wherein said blade elements define a parabolic surface.

16. The wind turbine assembly of claim 15, wherein said target axis is further defined as a focal axis of said parabolic surface.

17. The wind turbine assembly of claim 1, wherein said plurality of rotors is further defined as eight rotors.

18. The wind turbine assembly of claim 1, further comprising a support stand to space said cantilever support from a ground surface.

19. The wind turbine assembly of claim 18, further comprising a support bearing coupled to said support stand and to said cantilever arm to support said cantilever arm for rotation relative to said support stand.

20. The wind turbine assembly of claim 18, further comprising a solar photovoltaic cells unit coupled to said support stand.

* * * * *